United States Patent
Kapoor et al.

(10) Patent No.: US 9,569,570 B2
(45) Date of Patent: Feb. 14, 2017

(54) CONFIGURABLE DELAY CELL

(71) Applicants: Gourav Kapoor, Noida (IN); Gaurav Gupta, Noida (IN); Syed Shakir Iqbal, New Delhi (IN)

(72) Inventors: Gourav Kapoor, Noida (IN); Gaurav Gupta, Noida (IN); Syed Shakir Iqbal, New Delhi (IN)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 90 days.

(21) Appl. No.: 14/675,757

(22) Filed: Apr. 1, 2015

(65) Prior Publication Data
US 2016/0292333 A1 Oct. 6, 2016

(51) Int. Cl.
*G06F 17/50* (2006.01)
(52) U.S. Cl.
CPC .................. *G06F 17/5031* (2013.01)
(58) Field of Classification Search
CPC ....................................................... G06F 17/50
USPC ......................................................... 716/126
See application file for complete search history.

(56) References Cited

U.S. PATENT DOCUMENTS

| | | |
|---|---|---|
| 5,121,014 A | 6/1992 | Huang |
| 5,227,679 A | 7/1993 | Woo |
| 5,798,659 A | 8/1998 | Shay et al. |
| 6,172,545 B1 | 1/2001 | Ishii |
| 7,221,214 B2 | 5/2007 | Santou |
| 7,236,013 B2 | 6/2007 | Kasanyal et al. |
| 7,310,008 B1 | 12/2007 | Masleid |
| 7,312,631 B1 | 12/2007 | Bauer et al. |
| 7,363,422 B2 | 4/2008 | Perego et al. |
| 7,545,195 B2 | 6/2009 | Farmer |
| 7,548,089 B1 | 6/2009 | Bauer et al. |
| 7,635,992 B1 | 12/2009 | Masleid |
| 8,595,668 B1 | 11/2013 | Soni et al. |
| 8,701,064 B2 | 4/2014 | Murakawa |
| 2010/0231263 A1* | 9/2010 | Fish ................... H03K 19/0948 326/121 |
| 2014/0084981 A1 | 3/2014 | Soni et al. |

* cited by examiner

*Primary Examiner* — Thuan Do
(74) *Attorney, Agent, or Firm* — Charles E. Bergere

(57) ABSTRACT

A configurable delay cell for an integrated circuit includes a CMOS inverter and first through fourth transistors. A drain of the third transistor is connected to a drain of the fourth transistor for generating an output signal. A connection between an output terminal of the CMOS inverter and a source of the first transistor, a connection between the output terminal of the CMOS inverter and a drain of the second transistor, and a connection between the source of the first transistor and the drain of the second transistor are configurable, using an electronic design automation (EDA) tool, for achieving first, second, third, fourth, and fifth delay values. The resulting delay value can be programmed by making changes only in one or more of the metal layers of the integrated circuit.

18 Claims, 9 Drawing Sheets

US 9,569,570 B2

CONFIGURABLE DELAY CELL

BACKGROUND OF THE INVENTION

The present invention relates generally to integrated circuits, and, more particularly to a delay cell having a delay that can be configured by making changes in only the metal layers of the integrated circuit.

Integrated circuits (ICs) including system-on-chips (SoCs) integrate various digital as well as analog elements on a single chip. These elements may operate synchronously or asynchronously. Timing errors (also known as "timing violations") such as setup and hold time violations impair the operation of the synchronous elements causing the IC to function erratically. Thus, it is essential to identify the timing errors at the design stage, before fabricating the IC. In the design stage, the timing errors are corrected by adjusting delay values in the signal paths, typically by inserting buffers into the signal paths.

Timing closure is the process by which the IC design is iteratively modified to achieve the desired timing requirements. Timing analysis for achieving the desired timing requirements is performed by an electronic design automation (EDA) tool.

Spare delay cells are inserted into the signal paths of the IC design so that the delay values of the signal paths can be adjusted. Additional delay cells may be added to adjust the delay value of the signal paths based on the timing analysis. However, adjusting the delay value of the signal paths by inserting additional delay cells into the signal path or using the spare delay cells can lead to changes in placement and routing of the IC design. As a result, the placement and routing need to be re-performed, which requires many engineering hours and hence increases costs and impacts delivery.

A known technique to overcome the aforementioned problem is to insert configurable delay cells in the signal paths of the IC design. FIG. 1 is a schematic circuit diagram of a first conventional delay cell 100 including first and second buffers 102 and 104. The first delay cell 100 is configurable for achieving first and second delay values, where the second delay value is greater than the first delay value. The first buffer 102 includes first and second complementary metal-oxide semiconductor (CMOS) inverters 106 and 108 and the second buffer 104 includes third and fourth CMOS inverters 110 and 112. Each of the first though fourth CMOS inverters 106-112 has an input terminal and an output terminal.

The first CMOS inverter 106 includes first and second transistors 114 and 116, where the first transistor 114 may be a p-channel metal-oxide semiconductor (PMOS) transistor and the second transistor 116 may be an n-channel MOS (NMOS) transistor.

The first transistor 114 has a source terminal for receiving a first supply voltage (referred to as "$V_{DD}$") and a gate terminal connected to the input terminal of the first CMOS inverter 106 for receiving an input signal (referred to as "$V_{IN}$"). The second transistor 116 has a source terminal for receiving a second supply voltage (referred to as "$V_{SS}$"), a gate terminal connected to the input terminal of the first CMOS inverter 106 for receiving the input signal ($V_{IN}$), and a drain terminal connected to a drain terminal of the first transistor 114 for generating an inverted input signal. The first CMOS inverter 106 receives the input signal ($V_{IN}$) at its input terminal and generates the inverted input signal at its output terminal.

The second CMOS inverter 108 includes third and fourth transistors 118 and 120. The third CMOS inverter 110 includes fifth and sixth transistors 122 and 124, and the fourth CMOS inverter 112 includes seventh and eighth transistors 126 and 128. The third, fifth, and seventh transistors 118, 122, and 126 are PMOS transistors, and the fourth, sixth, and eighth transistors 120, 124, and 128 are NMOS transistors. The second, third, and fourth CMOS inverters 108, 110, and 112 are structurally and functionally similar to the first CMOS inverter 106.

The first and second CMOS inverters 106 and 108 are connected in series, i.e., the input terminal of the second CMOS inverter 108 is connected to the output terminal of the first CMOS inverter 106. Thus, the second CMOS inverter 108 outputs a delayed version of the input signal ($V_{IN}$) at its output terminal. The third and fourth CMOS inverters 110 and 112 also are connected in series, i.e., the input terminal of the fourth CMOS inverter 112 is connected to the output terminal of the third CMOS inverter 110.

A connection between the output terminal of the second CMOS inverter 108 and the input terminal of the third CMOS inverter 110 is configurable for achieving the first and second delay values. The output terminal of the second CMOS inverter 108 is connected to the input terminal of the third CMOS inverter 110 for achieving the second delay value. The first delay cell 100 receives the input signal and outputs an output signal (referred to as "$V_{OUT}$") that is a delayed version of the input signal ($V_{IN}$).

During timing closure, if it is determined that an increase in the delay value of the signal path is required, then the output terminal of the second CMOS inverter 108 is connected to the input terminal of the third CMOS inverter 110 by modifying a layout of the IC design during the design stage using an EDA tool.

However, the first delay cell 100 includes at least 8 transistors so that the first delay cell 100 can be configured for achieving one of the two delay values as determined by timing requirements. When the delay cell 100 is configured for achieving the first delay value, leakage current flows through the third and fourth CMOS inverters 110 and 112 leading wasted power. Further, when the first delay cell 100 is configured for achieving the first delay value, the third and fourth CMOS inverters 110 and 112 are not used and hence, contribute to area overhead.

FIG. 2 illustrates a second conventional delay cell 200 that is configurable for achieving first and second delay values, where the second delay value is greater than the first delay value. The second delay cell 200 includes first through sixth transistors 202-212 where the first, second, and fifth transistors 202, 204, and 210 are PMOS transistors, and the third, fourth, and sixth transistors 206, 208, and 212 are NMOS transistors.

The first transistor 202 has a source terminal connected to a first supply voltage ($V_{DD}$) and a gate terminal for receiving an input signal ($V_{IN}$). The second transistor 204 has a source terminal connected to a drain terminal of the first transistor 202 and a gate terminal for receiving the input signal $V_{IN}$. The third transistor 206 has a gate terminal for receiving the input signal $V_{IN}$ and a drain terminal connected to a drain terminal of the second transistor 204 for generating an inverted input signal ("$V_{INV\_IN}$"). The fourth transistor 208 has a drain terminal connected to a source terminal of the third transistor 206, a gate terminal for receiving the input signal $V_{IN}$, and a source terminal for receiving a second supply voltage ("$V_{SS}$").

The fifth transistor 210 has a source terminal for receiving the first supply voltage $V_{DD}$, a gate terminal for receiving a control signal ("$V_{CONTROL}$"), and a drain terminal connected to the drain terminal of the first transistor 202. Thus, the fifth transistor 210 is connected in parallel with the first transistor 202.

The sixth transistor 212 has a drain terminal connected to the drain terminal of the fourth transistor 208, a gate terminal for receiving an inverted control signal ("$V_{INV\_CONTROL}$"), and a source terminal for receiving the second supply voltage $V_{SS}$. Thus, the sixth transistor 212 is connected in parallel with the fourth transistor 208.

When the control signal $V_{CONTROL}$ is low (i.e., logic low state), the fifth and sixth transistors 210 and 212 are enabled, which decreases the impedance of the second delay cell 200. Thus, the second delay cell 200 is configured for achieving the first delay value. When the control signal $V_{CONTROL}$ is high (i.e., logic high state), the fifth and sixth transistors 210 and 212 are disabled so the second delay cell 200 is configured for achieving the second delay value.

During timing closure, if it is determined that a decrease in the delay value of the signal path is required, then the fifth and sixth transistors 210 and 212 are enabled using an EDA tool.

However, the second delay cell 200 includes at least six transistors. When the second delay cell 200 is configured for achieving the first delay value by disabling the fifth and sixth transistors 210 and 212, leakage current flows through the fifth and sixth transistors 210 and 212 leading to wasted power. Further, when the second delay cell 200 is configured for achieving the first delay value, the fifth and sixth transistors 210 and 212 are not used and hence, contribute to area overhead.

Another known technique for adjusting delay value is to have a configurable source-drain connection for each transistor of a conventional delay cell (not shown). The source of a transistor is connected to the drain of the transistor by modifying the IC layout during the design stage using the EDA tool. However, the delay cell requires a large number of transistors for achieving a given number of delay values.

Yet another known technique of adjusting the delay value introduced by the delay cell is to change the channel lengths or widths of transistors of the delay cell for achieving various delay values. Increasing the width of a transistor decreases the delay value and decreasing the width of the transistor increases the delay value. Similarly, increasing the channel length of the transistor increases the delay value and decreasing the channel length of the transistor decreases the delay value. Further, the delay values can be adjusted by changing the threshold values of the transistors by controlling the amount of impurity in the channels of the transistors.

However, changes in the widths, lengths, or threshold voltages of transistors in the IC design are subject to process variations and hence, may not provide desired delay values. Thus, it is not desirable to change the widths, lengths, or threshold voltages to adjust the delay values of the delay cell.

It would be advantageous to have a delay cell that can be configured to achieve a desired delay value, uses fewer of transistors, and reduces area and power overheads.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
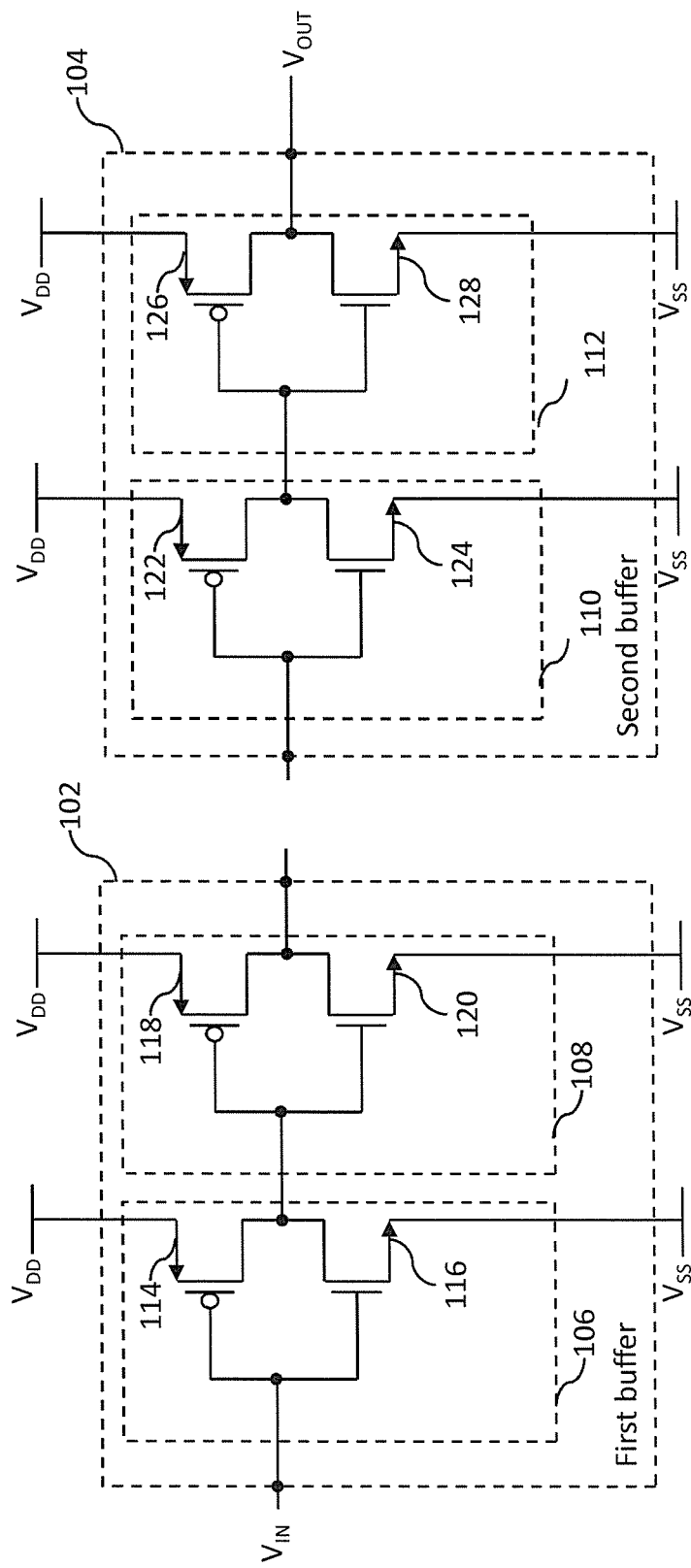
FIG. 1 is a schematic circuit diagram of a first conventional delay cell.
Figure 2:
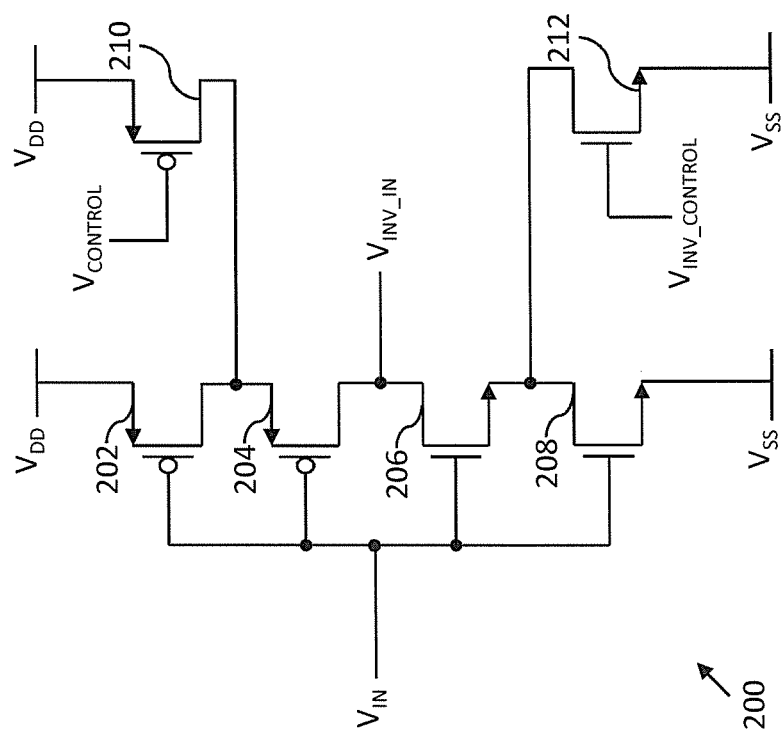
FIG. 2 is a schematic circuit diagram of a second conventional delay cell.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a configurable delay cell is provided. The configurable delay cell includes a CMOS inverter and first through fourth transistors. The CMOS inverter receives an input signal its input terminal and generates an inverted input signal at its output terminal. The first transistor has a first diffusion terminal for receiving the inverted input signal, a gate terminal for receiving a first signal, and a second diffusion terminal for outputting a first intermediate signal. The second transistor has a second diffusion terminal for receiving the inverted input signal, a gate terminal for receiving a second signal, and a first diffusion terminal for outputting a second intermediate signal. The third transistor has a second diffusion terminal for receiving a first supply voltage and a gate terminal for receiving the first intermediate signal. The fourth transistor has a second diffusion terminal for receiving a second supply voltage, a gate terminal for receiving the second intermediate signal, and a first diffusion terminal connected to a first diffusion terminal of the third transistor for generating an output signal. A connection between the output terminal of the CMOS inverter and the second diffusion terminal of the first transistor, a connection between the output terminal of the CMOS inverter and the first diffusion terminal of the second transistor, and a connection between the second diffusion terminal of the first transistor and the first diffusion terminal of the second transistor are configurable for achieving first, second, third, fourth, and fifth delay values.

In another embodiment of the present invention, an EDA tool is provided. The EDA tool includes a memory and a processor in communication with the memory. The memory stores an integrated circuit (IC) design. The IC design includes a configurable delay cell. The configurable delay cell includes a CMOS inverter and first through fourth transistors. The CMOS inverter receives an input signal at its input terminal and generates an inverted input signal at its output terminal. The first transistor has a first diffusion terminal for receiving the inverted input signal, a gate terminal for receiving a first signal, and a second diffusion terminal for outputting a first intermediate signal. The second transistor has a second diffusion terminal for receiving the inverted input signal, a gate terminal for receiving a second signal, and a first diffusion terminal for outputting a second intermediate signal. The third transistor has a second diffusion terminal for receiving a first supply voltage and a gate terminal for receiving the first intermediate signal. The fourth transistor has a second diffusion terminal for receiving a second supply voltage, a gate terminal for receiving the second intermediate signal, and a first diffusion terminal connected to a first diffusion terminal of the third transistor for generating an output signal. A connection between the output terminal of the CMOS inverter and the second diffusion terminal of the first transistor, a connection between the output terminal of the CMOS inverter and the first diffusion terminal of the second transistor, and a connection between the second diffusion terminal of the first transistor and the first diffusion terminal of the second transistor are configurable by way of the processor for achieving first, second, third, fourth, and fifth delay values. The processor is configured for performing a timing analysis of the IC design. The processor is further configured for configuring the configurable delay cell for achieving at least one of first, second, third, fourth, and fifth delay values based on the timing analysis and generating a modified IC design. The modified IC design is stored in the memory.

Figure 3:
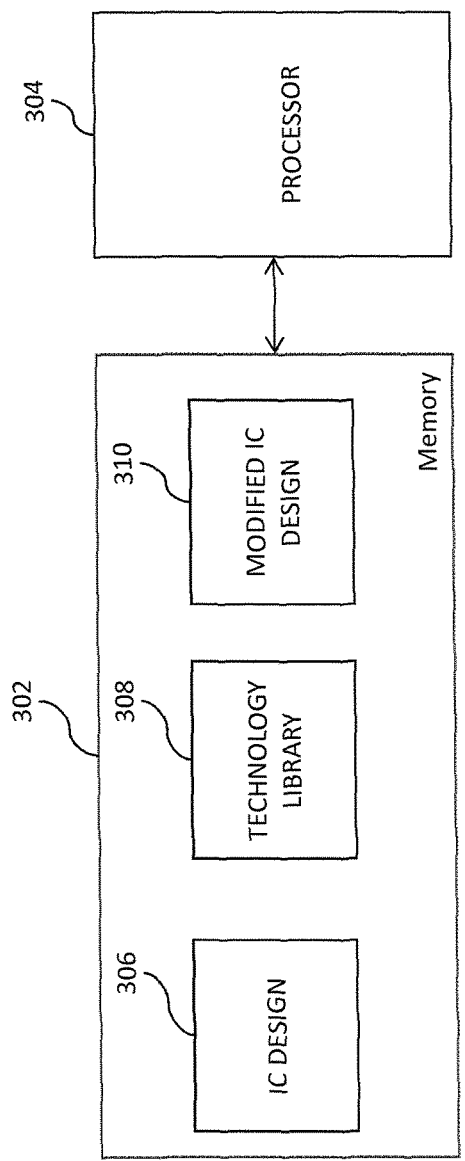
FIG. 3 is a schematic block diagram of an electronic design automation (EDA) tool for configuring a configurable delay cell of an IC design in accordance with an embodiment of the present invention.

Referring now to FIG. 3, a schematic block diagram of an EDA tool 300 in accordance with an embodiment of the present invention is shown. The EDA tool 300 includes a memory 302 and a processor 304 in communication with the memory 302. The memory 302 receives and stores an IC design 306 (the "initial IC design 306"). The memory 302 includes a technology library 308. The initial IC design 306 may comprise any circuit design that includes digital logic elements, digital memory elements, or a combination thereof. Examples of digital logic elements include an AND gate, an OR gate, a NOT gate, a NOR gate, a NAND gate, an XOR gate, an XNOR gate, and/or a combinational logic circuit that includes a combination of the above-mentioned gates. Examples of digital memory elements include a flip-flop, a latch, a shift-register, a multiplexer, and a demultiplexer. The technology library 308 stores instances of the digital memory elements and digital logic elements.

The processor 304 and the memory 302 comprise a computer system that can range from a stand-alone personal computer to a network of processors and memories, to a mainframe system. The computer system must be able to run verification tools that can simulate digital and analog circuits, such as Incisive™ Unified Simulator (IUS) by Cadence Design Systems, Inc. Such tools and computer systems are known to those of skill in the art. Examples of the initial IC design 306 include microprocessor, microcontroller unit (MCU), system-on-chip (SoC), and application specific IC (ASIC) designs.

The EDA tool 300 modifies the initial IC design 306, thereby generating a modified IC design 310. The processor 304 stores the modified IC design 310 in the memory 302.

Figure 4:
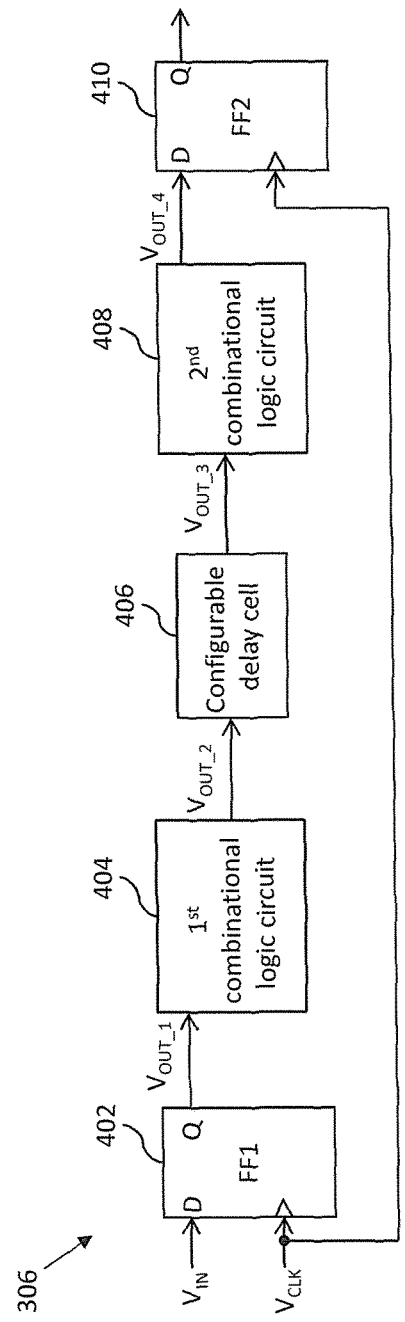
FIG. 4 is a schematic block diagram of the IC design of FIG. 3 that includes the configurable delay cell in accordance with an embodiment of the present invention.

Referring now to FIG. 4, a schematic block diagram of the initial IC design 306 in accordance with an embodiment of the present invention is shown. The initial IC design 306 includes a first flip-flop 402, a first combinational logic circuit 404, a configurable delay cell 406, a second combinational logic circuit 408, and a second flip-flop 410.

The first flip-flop 402 has an input terminal for receiving an input signal (referred to as "$V_{IN}$"), a clock terminal for receiving a clock signal (referred to as "$V_{CLOCK}$"), and an output terminal for outputting a first output signal (referred to as "$V_{OUT\_1}$").

The first combinational logic circuit 404 is connected to the first flip-flop 402 for receiving the first output signal ($V_{OUT\_1}$) and generating a second output signal (referred to as "$V_{OUT\_2}$"). Examples of the first combinational logic circuit 404 include an AND gate, a NAND gate, an OR gate, an XOR gate, an XNOR gate, a NOR gate, and a NOT gate, or a combination thereof.

The configurable delay cell 406 has an input terminal for receiving the second output signal ($V_{OUT\_2}$) and outputting a third output signal (referred to as "$V_{OUT\_3}$"). The third output signal ($V_{OUT\_3}$) is a delayed version of the second output signal ($V_{OUT\_2}$).

The second combinational logic circuit 408 is connected to the configurable delay cell 406 for receiving the third output signal ($V_{OUT\_3}$) and generating a fourth output signal (referred to as "$V_{OUT\_4}$"). Examples of the second combinational logic circuit 408 include an AND gate, a NAND gate, an OR gate, an XOR gate, an XNOR gate, a NOR gate, and a NOT gate, or a combination thereof.

The second flip-flop 410 has an input terminal connected to the second combinational logic circuit 408 for receiving the fourth output signal ($V_{OUT\_4}$), a clock terminal for receiving the clock signal ($V_{CLOCK}$), and an output terminal for outputting the fifth output signal (referred to as "$V_{OUT\_5}$").

Referring now to FIGS. 5A, 5B, 5C, 5D and 5E, schematic circuit diagrams of different configurations of the configurable delay cell 406 of FIG. 4 in accordance with an embodiment of the present invention is shown. The different configurations include first through fifth configurable delay cells 406a-406e. The first through fifth configurable delay cells 406a-406e each include a complementary-metal oxide semiconductor (CMOS) inverter 502 and first through fourth transistors 504-510.

The CMOS inverter 502 has an input terminal for receiving the second output signal (referred to as "$V_{OUT\_2}$") and an output terminal for generating an inverted second output signal.

The CMOS inverter 502 includes fifth and sixth transistors 512 and 514. The fifth transistor 512 has a second diffusion terminal (hereinafter referred to as "source terminal") for receiving a first supply voltage (referred to as "$V_{DD}$") and a gate terminal for receiving the second output signal ($V_{OUT\_2}$).

The sixth transistor 514 has a source terminal for receiving a second supply voltage (referred to as "$V_{SS}$") and a gate terminal for receiving the second output signal ($V_{OUT\_2}$). The sixth transistor 514 has a first diffusion terminal (hereinafter referred to as "drain terminal") connected to a drain terminal of the fifth transistor 512 for generating the inverted second output signal.

The first transistor 504 has a drain terminal connected to the output terminal of the CMOS inverter 502 for receiving the inverted second output signal, a gate terminal for receiving a first signal, and a source terminal for outputting a first intermediate signal.

The second transistor 506 has a source terminal connected to the output terminal of the CMOS inverter 502 for receiving the inverted second output signal, a gate terminal for receiving a second signal, and a drain terminal for outputting a second intermediate signal.

The third transistor 508 has a source terminal for receiving the first supply voltage ($V_{DD}$) and a gate terminal connected to the source terminal of the first transistor 504 for receiving the first intermediate signal.

The fourth transistor 510 has a source terminal for receiving the second supply voltage ($V_{SS}$) and a gate terminal connected to the drain terminal of the second transistor 506 for receiving the second intermediate signal. The fourth transistor 510 has a drain terminal connected to a drain terminal of the third transistor 508 for generating the third output signal (referred to as "$V_{OUT\_3}$").

In the first through fifth configurable delay cells 406a-406e, a connection between the output terminal of the CMOS inverter 502 and the source terminal of the first transistor 504 is configurable. A connection between the output terminal of the CMOS inverter 502 and the drain terminal of the second transistor 506 is configurable. A connection between the source terminal of the first transistor 504 and the drain terminal of the second transistor 506 is configurable. The processor 304 configures the first through fifth configurable delay cells 406a-406e for achieving first, second, third, fourth, and fifth delay values, respectively.

Figure 5A:
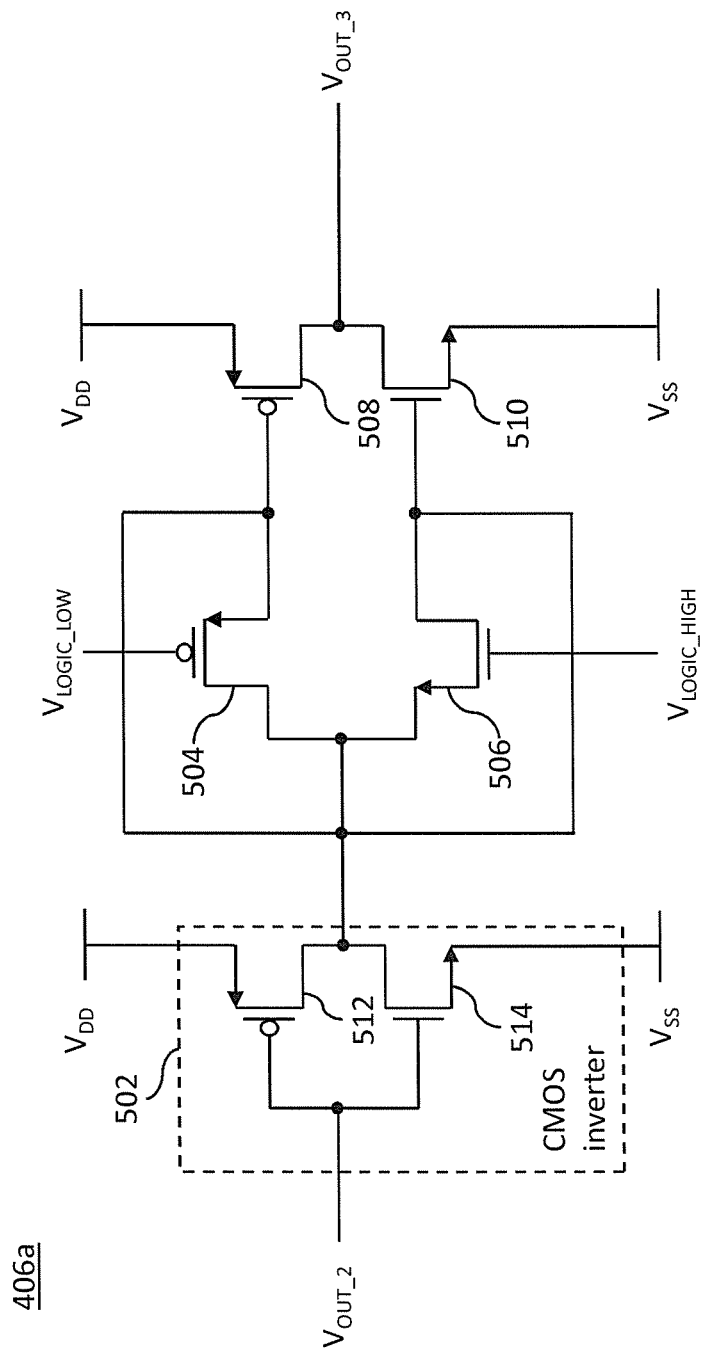
FIGS. 5A, 5B, 5C, 5D, and 5E are schematic circuit diagrams of different configurations of the configurable delay cell of FIG. 4 in accordance with an embodiment of the present invention.

In FIG. 5A, the first and seconds signal are logic low and logic high signals, respectively (referred to as "$V_{LOGIC\_LOW}$" and "$V_{LOGIC\_HIGH}$", respectively). In an embodiment of the present invention, the first and second signals are signals corresponding to the second supply voltage ($V_{SS}$) and the first supply voltage ($V_{DD}$), respectively. The output terminal of the CMOS inverter 502 is connected to the source terminal of the first transistor 504 and the drain terminal of the second transistor 506 by way of the processor 304, thereby connecting the source terminal of the first transistor 504 and the drain terminal of the second transistor 506 and achieving the first delay value. As the drain terminal of the first transistor 504 is connected to the source terminal of the first transistor 504 by the processor 304, the first transistor 504 is bypassed and hence, effective impedance between the output terminal of the CMOS inverter 502 and the gate terminal of the third transistor 508 is substantially equal to zero. As the drain terminal of the second transistor 506 is connected to the source terminal of the second transistor 506 by the processor 304, the second transistor 506 is bypassed and hence, the effective impedance between the output terminal of the CMOS inverter 502 and the gate terminal of the fourth transistor 510 is substantially equal to zero. Thus, the first configurable delay cell 406a is also referred to as a minimum delay cell 406a.

Figure 5B:
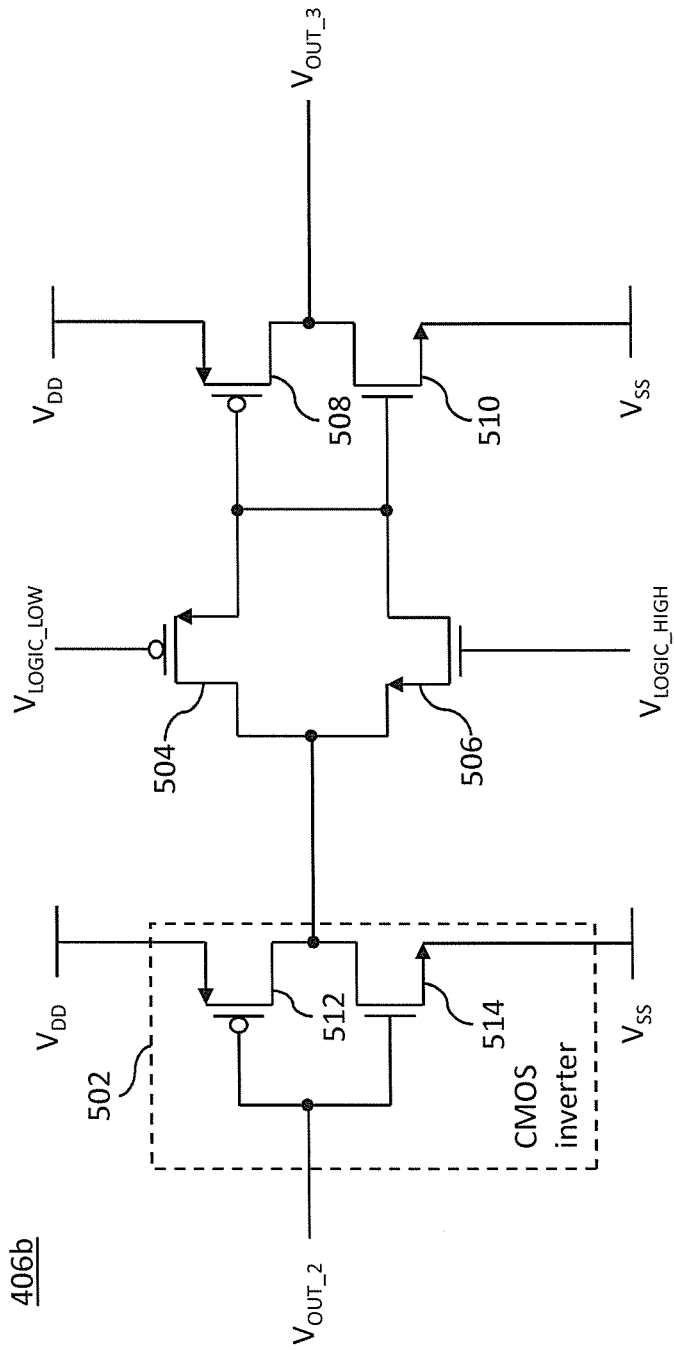

In FIG. 5B, the first and second signals are the logic low and logic high signals ($V_{LOGIC\_LOW}$ and $V_{LOGIC\_HIGH}$), respectively. The processor 304 does not connect the output terminal of the CMOS inverter 502 and the source terminal of the first transistor 504 and the drain terminal of the second transistor 506. However, the source terminal of the first transistor 504 is connected to the drain terminal of the second transistor 506 by way of the processor 304. Thus, the second configurable delay cell 406b is configured for achieving the second delay value. As the source terminal of the first transistor 504 is connected to the drain terminal of the second transistor 506 and the drain terminal of the first transistor 504 is connected to the source terminal of the second transistor 506, the first transistor 504 is connected in parallel with the second transistor 506. Therefore, the effective impedance between the output terminal of the CMOS inverter 502 and the gate terminal of the third transistor 508, and the effective impedance between the output terminal of the CMOS inverter 502 and the gate terminal of the fourth transistor 510 are not equal to zero. Hence, the second delay value is greater than the first delay value. Thus, the second configurable delay cell 406b is also referred to as an average delay cell 406b.

Figure 5C:
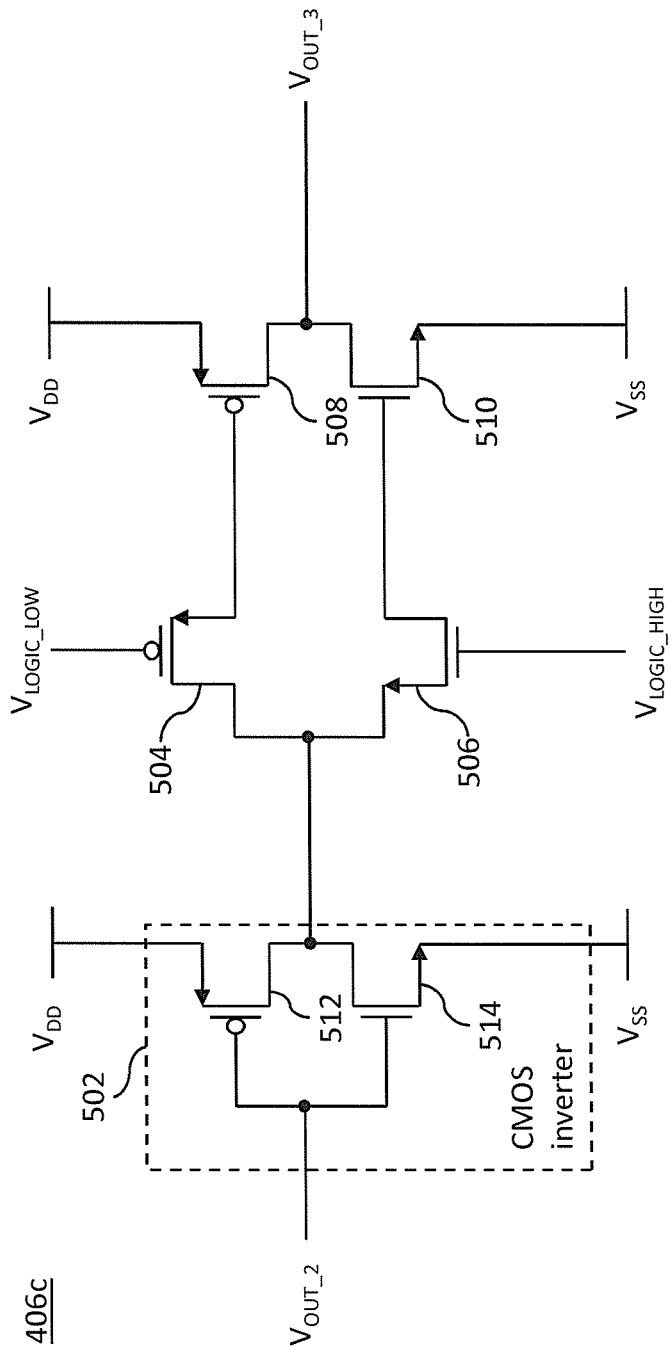

In FIG. 5C, the first and second signals are the logic low and logic high signals ($V_{LOGIC\_LOW}$ and $V_{LOGIC\_HIGH}$), respectively. The processor 304 does not connect the output terminal of the CMOS inverter 502 to the source terminal of the first transistor 504 and the drain terminal of the second transistor 506. Further, the processor 304 does not connect the source terminal of the first transistor 504 to the drain terminal of the second transistor 506. Thus, the third configurable delay cell 406c is configured for achieving the third delay value. As the first and second transistors 504 and 506 are neither bypassed nor connected in parallel to each other, the third delay value is greater than the first and second delay values. Thus, the third configurable delay cell 406c is also referred to as a maximum delay cell 406c.

Figure 5D:
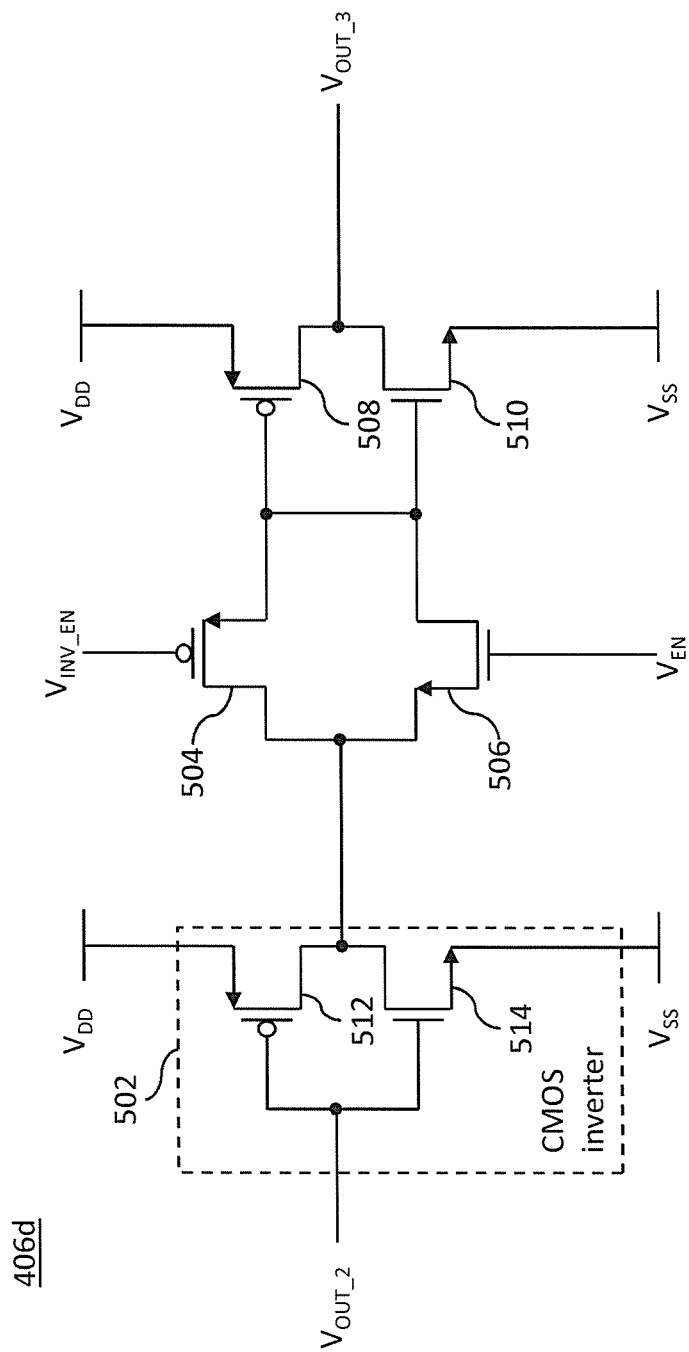

In FIG. 5D, the first and second signals are inverted enable and enable signals, respectively (referred to as "$V_{INV\_EN}$" and "$V_{EN}$", respectively). The processor 304 does not connect the output terminal of the CMOS inverter 502 to the source terminal of the first transistor 504 and the drain terminal of the second transistor 506. However, the source terminal of the first transistor 504 is connected to the drain terminal of the second transistor 506 by way of the processor 304. Hence, the first transistor 504 is connected in parallel with the second transistor 506. Thus, the fourth configurable delay cell 406d is also referred to as a minimum tri-state delay cell 406d and is configured for achieving the fourth delay value.

Figure 5E:
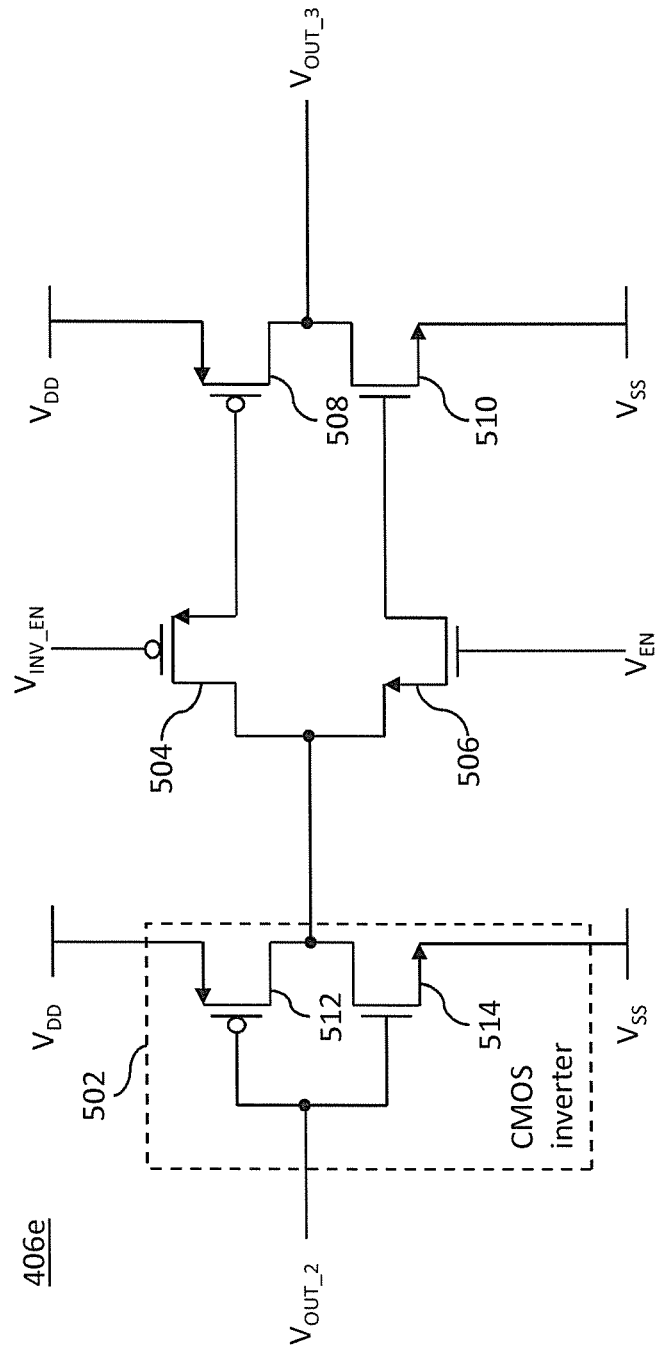

In FIG. 5E, the first and second signals are the inverted enable and enable signals ($V_{INV\_EN}$ and $V_{EN}$) respectively. The processor 304 does not connect the output terminal of the CMOS inverter 502 to the source terminal of the first transistor 504 and the drain terminal of the second transistor 506. Further, the processor 304 does not connect the source terminal of the first transistor 504 to the drain terminal of the second transistor 506. Thus, the fifth configurable delay cell 406e is also referred to as a maximum tri-state delay cell 406e and is configured for achieving the fifth delay value. As the first and second transistors 504 and 506 are neither bypassed nor connected in parallel to each other, the fifth delay value is greater than the fourth delay value.

Figure 6:
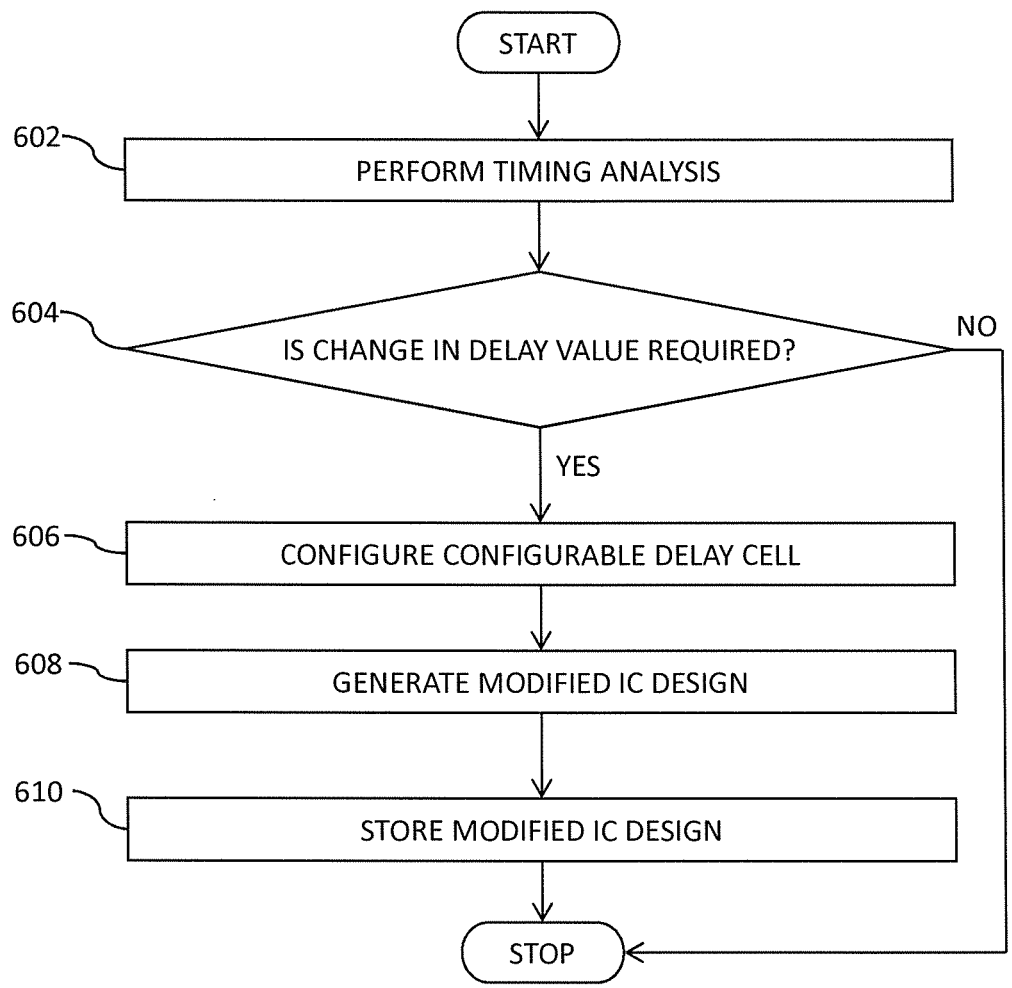
FIG. 6 is a flow chart illustrating a method for configuring the configurable delay cell of FIG. 4 performed by the EDA tool of FIG. 3 in accordance with an embodiment of the present invention.

FIG. 6 illustrates a method for configuring the configurable delay cell 406 that is performed by the EDA tool 300. The processor 304 performs a timing analysis of the initial IC design 306. The initial IC design 306 includes the configurable delay cell 406. The configurable delay cell 406 is at least one of the first through fifth configurable delay cells 406a-406e.

At step 602, the processor 304 performs the timing analysis of the initial IC design 306. At step 604, the processor 304 checks to determine whether a change in the delay value of the configurable delay cell 406 is required based on the timing analysis. If at step 604, the processor 304 determines that a change in the delay value of the configurable delay cell 406 is required, the processor 304 executes step 606. At step 606, the processor 304 configures the configurable delay cell 406 based on the timing analysis such that the initial IC design 306 meets the timing requirements. The processor 304 configures the configurable delay cell 406 to achieve one of the first through fifth delay values. At step 608, the processor 304 generates the modified IC design 310. At step 610, the processor 304 stores the modified IC design 310 in the memory 302.

Thus, the modified IC design 310 is generated by executing the steps 602-610. The modified IC design 310 is used to fabricate an IC using known processes, i.e., by providing the necessary design data files to a fabrication facility. Subsequently, the IC is fabricated on a semiconductor wafer based on the design data files.

In an example, the configurable delay cell 406 is the second configurable delay cell 406b. The processor 304 performs the timing analysis of the initial IC design 306. The processor 304 determines that a change in the delay of the configurable delay cell 406 is required based on the timing analysis, i.e., a signal path between the first and second flip-flops 402 and 410 is a critical path and the delay value of the configurable delay cell 406 needs to be reduced for meeting the timing requirements. The processor 304 disconnects the source terminal of the first transistor 504 from the drain terminal of the second transistor 506, i.e., the processor 304 removes the connection between the source terminal of the first transistor 504 and the drain terminal of the second transistor 506 by modifying the layout of the initial IC design 306. The processor 304 connects the output terminal of the CMOS inverter 502 to the source terminal of the first transistor 504, i.e., the processor 304 places a connection between the output terminal of the CMOS inverter 502 and the source terminal of the first transistor 504 by modifying the layout of the initial IC design 306. The processor 304 connects the output terminal of the CMOS inverter 502 to the drain terminal of the second transistor 506, i.e., the processor 304 places a connection between the output terminal of the CMOS inverter 502 and the drain terminal of the second transistor 506 by modifying the layout of the initial IC design 306. Thus, the processor 304 configures the configurable delay cell 406 to represent the first configurable delay cell 406a, thereby achieving the first delay value by modifying at least one metal layer of the layout of the initial IC design 306 and meeting the timing requirements.

In an embodiment of the present invention, the processor 304 includes instructions to configure the configurable delay cell 406 by modifying at least one metal layer of the layout of the initial IC design 306, based on a timing analysis performed by the processor 304. In another embodiment of the present invention, the processor 304 configures the configurable delay cell 406 based on inputs received from an IC designer.

In yet another embodiment of the present invention, the first through third configurable delay cells 406a-406c can be modified to achieve one of fourth and fifth delay values of the fourth and fifth configurable delay cells 406d and 406e, respectively, by modifying at least one metal layer of the layout of the initial IC design 306. Thus, the gate terminal of the first and second transistors 504 and 506 of FIG. 5A, 5B, or 5C can be connected to a metal layer for receiving the inverted enable and enable signals ($V_{INV\_EN}$ and $V_{EN}$) respectively. The gate terminals of the first and second transistors 504 and 506 of FIG. 5A, 5B, or 5C may be connected to the metal layer by way of one or more metal layers and or vias for receiving the inverted enable and enable signals ($V_{INV\_EN}$ and $V_{EN}$), respectively.

It will be understood by those skilled in the art that standard cells corresponding to the first through fifth configurable delay cells 406a-406e may be stored in the technology library 308 and have same size and footprint as that of the configurable delay cell 406. Thus, the processor 304 may replace the configurable delay cell 406 with one of the standard cells from the technology library 308 for meeting the timing requirements. Further, the timing analysis may be performed by a first processor of the EDA tool and a second processor of the EDA tool may configure the configurable delay cell 406 based on the timing analysis to meet the timing requirements.

Thus, the processor 304 modifies the layout of the initial IC design 306 without modifying clock tree or any other cell in the layout of the initial IC design 306 for achieving the desired delay value. Hence, it is not necessary to re-perform cell placement and signal routing as the placement and routing results are not disturbed. Further, the configurable delay cell 406 is configurable for achieving one of the five delay values, i.e., the first through fifth delay values using less number of transistors as compared to the conventional delay cells, thereby resulting in lesser area and power overhead.

It will be understood by those of skill in the art that the same logical function may be performed by different arrangements of logic gates, or that logic circuits operate using either positive or negative logic signals. Therefore, variations in the arrangement of some of the logic gates described above should not be considered to depart from the scope of the present invention.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A configurable delay cell, comprising:
   a complementary metal-oxide semiconductor (CMOS) inverter having an input terminal for receiving an input signal and an output terminal for generating an inverted input signal;
   a first transistor having a first diffusion terminal connected to the output terminal of the CMOS inverter for receiving the inverted input signal, a gate terminal for receiving a first signal, and a second diffusion terminal for outputting a first intermediate signal;
   a second transistor having a first diffusion terminal for outputting a second intermediate signal, a second diffusion terminal connected to the output terminal of the CMOS inverter for receiving the inverted input signal, and a gate terminal for receiving a second signal;
   a third transistor having a first diffusion terminal, a second diffusion terminal for receiving a first supply voltage, and a gate terminal connected to the second diffusion terminal of the first transistor for receiving the first intermediate signal; and
   a fourth transistor having a first diffusion terminal connected to the first diffusion terminal of the third transistor for generating an output signal, a second diffusion terminal for receiving a second supply voltage, and a gate terminal connected to the first diffusion terminal of the second transistor for receiving the second intermediate signal, and
   wherein a connection between the output terminal of the CMOS inverter and the second diffusion terminal of the first transistor, a connection between the output terminal of the CMOS inverter and the first diffusion terminal of the second transistor, connecting the second and first signals to an enable signal and an inverted enable signal, respectively, and a connection between the second diffusion terminal of the first transistor and the first diffusion terminal of the second transistor are configurable for achieving first, second, third, fourth, and fifth delay values.

2. The configurable delay cell of claim 1, wherein the CMOS inverter comprises:
a fifth transistor having a first diffusion terminal, a second diffusion terminal for receiving the first supply voltage, and a gate terminal for receiving the input signal; and
a sixth transistor having a first diffusion terminal connected to the first diffusion terminal of the fifth transistor for generating the inverted input signal, a second diffusion terminal for receiving the second supply voltage, and a gate terminal for receiving the input signal.

3. The configurable delay cell of claim 1, wherein the first signal is a logic low signal and the second signal is a logic high signal.

4. The configurable delay cell of claim 3, wherein the output terminal of the CMOS inverter is connected to the second diffusion terminal of the first transistor, and to the first diffusion terminal of the second transistor for achieving the first delay value.

5. The configurable delay cell of claim 3, wherein the output terminal of the CMOS inverter is not connected to the second diffusion terminal of the first transistor, the output terminal of the CMOS inverter is not connected to the first diffusion terminal of the second transistor, and the second diffusion terminal of the first transistor is connected to the first diffusion terminal of the second transistor for achieving the second delay value.

6. The configurable delay cell of claim 3, wherein the output terminal of the CMOS inverter is not connected to the second diffusion terminal of the first transistor, the output terminal of the CMOS inverter is not connected to the first diffusion terminal of the second transistor, and the second diffusion terminal of the first transistor is not connected to the first diffusion terminal of the second transistor for achieving the third delay value.

7. The configurable delay cell of claim 1, wherein the output terminal of the CMOS inverter is not connected to the second diffusion terminal of the first transistor, the output terminal of the CMOS inverter is not connected to the first diffusion terminal of the second transistor, and the second diffusion terminal of the first transistor is connected to the first diffusion terminal of the second transistor for achieving the fourth delay value.

8. The configurable delay cell of claim 1, wherein the output terminal of the CMOS inverter is not connected to the second diffusion terminal of the first transistor, the output terminal of the CMOS inverter is not connected to the first diffusion terminal of the second transistor, and the second diffusion terminal of the first transistor is not connected to the first diffusion terminal of the second transistor for achieving the fifth delay value.

9. The configurable delay cell of claim 1, wherein the configurable delay cell is configured by modifying at least one metal layer thereof.

10. An electronic design automation tool (EDA) tool, comprising:
a memory for storing an integrated circuit (IC) design, wherein the IC design includes a configurable delay cell, and wherein the configurable delay cell includes:
a complementary metal-oxide semiconductor (CMOS) inverter having an input terminal for receiving an input signal and an output terminal for generating an inverted input signal;
a first transistor having a first diffusion terminal connected to the output terminal of the CMOS inverter for receiving the inverted input signal, a gate terminal for receiving a first signal, and a second diffusion terminal for outputting a first intermediate signal;
a second transistor having a first diffusion terminal for outputting a second intermediate signal, a second diffusion terminal connected to the output terminal of the CMOS inverter for receiving the inverted input signal, and a gate terminal for receiving a second signal;
a third transistor having a first diffusion terminal, a second diffusion terminal for receiving a first supply voltage, and a gate terminal connected to the second diffusion terminal of the first transistor for receiving the first intermediate signal; and
a fourth transistor having a first diffusion terminal connected to the first diffusion terminal of the third transistor for generating an output signal, a second diffusion terminal for receiving a second supply voltage, and a gate terminal connected to the first diffusion terminal of the second transistor for receiving the second intermediate signal; and
a processor in communication with the memory, wherein the processor is configured for:
performing a timing analysis on the IC design;
updating the IC design by configuring the configurable delay cell by configuring a connection between the output terminal of the CMOS inverter and the second diffusion terminal of the first transistor, a connection between the output terminal of the CMOS inverter and the first diffusion terminal of the second transistor, connecting the second and first signals to an enable signal and an inverted enable signal, respectively, and a connection between the second diffusion terminal of the first transistor and the first diffusion terminal of the second transistor for achieving at least one of first, second, third, fourth, and fifth delay values based on the timing analysis; and
saving the updated IC design in the memory.

11. The EDA tool of claim 10, wherein the CMOS inverter comprises:
a fifth transistor having a first diffusion terminal, a second diffusion terminal for receiving the first supply voltage, and a gate terminal for receiving the input signal; and
a sixth transistor having a first diffusion terminal connected to the first diffusion terminal of the fifth transistor for generating the inverted input signal, a second diffusion terminal for receiving the second supply voltage, and a gate terminal for receiving the input signal.

12. The EDA tool of claim 10, wherein the first signal is a logic low signal and the second signal is a logic high signal.

13. The EDA tool of claim 12, wherein the processor configures the configurable delay cell by connecting the output terminal of the CMOS inverter to the second diffusion terminal of the first transistor and connecting the output terminal of the CMOS inverter to the first diffusion terminal of the second transistor for achieving the first delay value.

14. The EDA tool of claim 12, wherein the processor configures the configurable delay cell by connecting the second diffusion terminal of the first transistor to the first diffusion terminal of the second transistor for achieving the second delay value, and wherein the output terminal of the CMOS inverter is not connected to the second diffusion terminal of the first transistor or the first diffusion terminal of the second transistor.

15. The EDA tool of claim 12, wherein the processor does not connect the output terminal of the CMOS inverter to the second diffusion terminal of the first transistor and the first diffusion terminal of the second transistor, and does not connect the second diffusion terminal of the first transistor to the first diffusion terminal of the second transistor, thereby configuring the configurable delay cell for achieving the third delay value.

16. The EDA tool of claim 10, wherein the processor configures the configurable delay cell by connecting the second diffusion terminal of the first transistor to the first diffusion terminal of the second transistor for achieving the fourth delay value, and wherein the output terminal of the CMOS inverter is not connected to the second diffusion terminal of the first transistor or the first diffusion terminal of the second transistor.

17. The EDA tool of claim 10, wherein the processor does not connect the output terminal of the CMOS inverter to the second diffusion terminal of the first transistor or the first diffusion terminal of the second transistor, and does not connect the second diffusion terminal of the first transistor to the first diffusion terminal of the second transistor, thereby configuring the configurable delay cell for achieving the fifth delay value.

18. The EDA tool of claim 10, wherein the processor configures the configurable delay cell by modifying at least one metal layer of the configurable delay cell in the IC design.

* * * * *